US007107827B2

(12) United States Patent
Kobayashi et al.

(10) Patent No.: US 7,107,827 B2

(45) Date of Patent: Sep. 19, 2006

(54) FUEL VAPOR LEAK CHECK MODULE

(75) Inventors: Mitsuyuki Kobayashi, Gamagori (JP); Yoshichika Yamada, Kuwana-gun (JP); Masao Kano, Gamagori (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 10/911,555

(22) Filed: Aug. 5, 2004

(65) Prior Publication Data

US 2005/0044936 A1 Mar. 3, 2005

(30) Foreign Application Priority Data

Aug. 25, 2003 (JP) ............................ 2003-300153

(51) Int. Cl.
*G01M 15/00* (2006.01)

(52) U.S. Cl. .................... 73/118.1; 73/117.2; 73/117.3; 73/116; 73/49.7

(58) Field of Classification Search ..................... None
See application file for complete search history.

(56) References Cited

U.S. PATENT DOCUMENTS 5,890,474 A 4/1999 Schnaibel et al.
2003/0015022 A1* 1/2003 Stegmann et al. ....... 73/40.5 R
2003/0051541 A1 3/2003 Kano et al.
2004/0000187 A1* 1/2004 Kobayashi et al. .......... 73/49.7

FOREIGN PATENT DOCUMENTS

JP 10-90107 4/1989
JP 2003-90270 3/2003

OTHER PUBLICATIONS

U.S. Appl. No. 10/923,786, filed Aug. 2004, Kano et al.
U.S. Appl. No. 10/923,005, filed Aug. 2004, Tsuruta et al.
U.S. Appl. No. 10/923,774, filed Aug. 2004, Kobayashi et al.
U.S. Appl. No. 10/922,999, filed Aug. 2004, Kobayashi et al.

* cited by examiner

*Primary Examiner*—Edward Lefkowitz
*Assistant Examiner*—Freddie Kirkland, III
(74) *Attorney, Agent, or Firm*—Nixon & Vanderhye PC

(57) ABSTRACT

A fuel vapor leak check module has a pressure sensor and a pump driven by a brushless motor. The pressure sensor is disposed at a place opposite to the inlet. A sensor room in which the pressure sensor is disposed communicates with the inlet of the pump through a pressure introducing passage and a pump-passage. Even if a pressure fluctuation arises at an inlet of the pump, a pressure fluctuation of the pressure in the fuel tank is restricted. Furthermore, the control circuit for the brushless motor is cooled by air flowing through a discharge passage. The sensor room is restricted from the discharge passage so that the discharged air hardly flows into the pressure room to enhance the accuracy of fuel vapor detection.

9 Claims, 4 Drawing Sheets

FUEL VAPOR LEAK CHECK MODULE

CROSS REFERENCE TO RELATED APPLICATION

This application is based on Japanese Patent Application No. 2003-300153 filed on Aug. 25, 2003, the disclosure of which is incorporated herein by reference.

FIELD OF THE INVENTION

The present invention relates to a fuel vapor leak check module, which detects leakage of fuel vapor generated in a fuel tank.

BACKGROUND OF THE INVENTION

In view of protecting the environment, fuel vapor has been controlled as well as the exhaust emission control. According to the regulation established by the Environmental Protection Agency (EPA) and the California Air Resourced Board (CARB), a leak detection of the fuel vapor from a fuel tank is required.

A conventional leak check system shown in JP-10-90107A, which is a counterpart of U.S. Pat. No. 5,890,474, has a pump which generate a pressure gradient between an inside and an outside of a fuel tank. When a leakage of fuel vapor from the fuel tank, a load of a motor driving the pump fluctuates. The detection of fuel vapor leakage is conducted by checking the fluctuation of the motor load.

However, because the motor load is detected based on current and voltage supplied thereto, fluctuation of the voltage and an atmospheric temperature around the motor may affect an accuracy of the detection of fuel vapor leakage. In order to improve the accuracy, JP-2003-90270A, which is a counterpart of US application Publication 2003/0051541A1, shows a fuel vapor leak check system which has a pressure sensor sensing an inner pressure of the fuel tank.

A pressure of air, which is induced to and discharged form the pump, fluctuates periodically. When the pressure sensor is disposed near the inlet and the outlet of the pump, a sensing accuracy of the pressure sensor is deteriorated.

SUMMARY OF THE INVENTION

An object of the present invention is to enhance the detecting accuracy of a fuel vapor leak check module.

According to the present invention, the pressure sensor is disposed at a position opposite to the inlet of the motor in such a manner that the pressure sensor and the inlet are disposed at opposite ends of a motor shaft. Thus, the pressure fluctuation at the inlet hardly affect the accuracy of detecting fuel vapor leak.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

Figure 2:
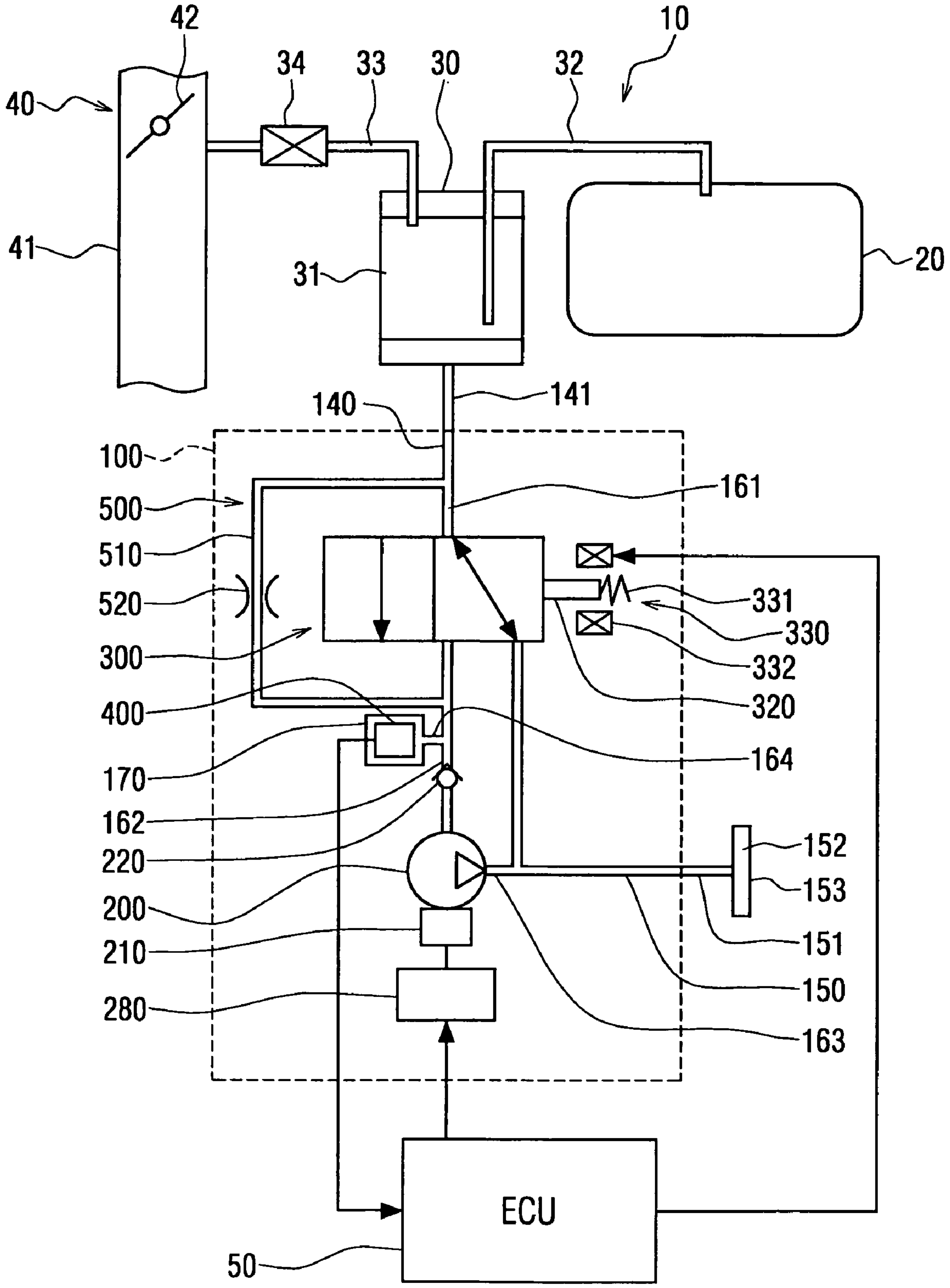
FIG. 2 is a schematic view of the leak check system to which the leak check module is applied.

FIG. 2 shows a fuel vapor leak check system to which a fuel vapor leak check module is applied. The fuel vapor leak check system is referred to as the leak check system, the fuel vapor leak check module is referred to as the leak check module herein after.

Figure 1:
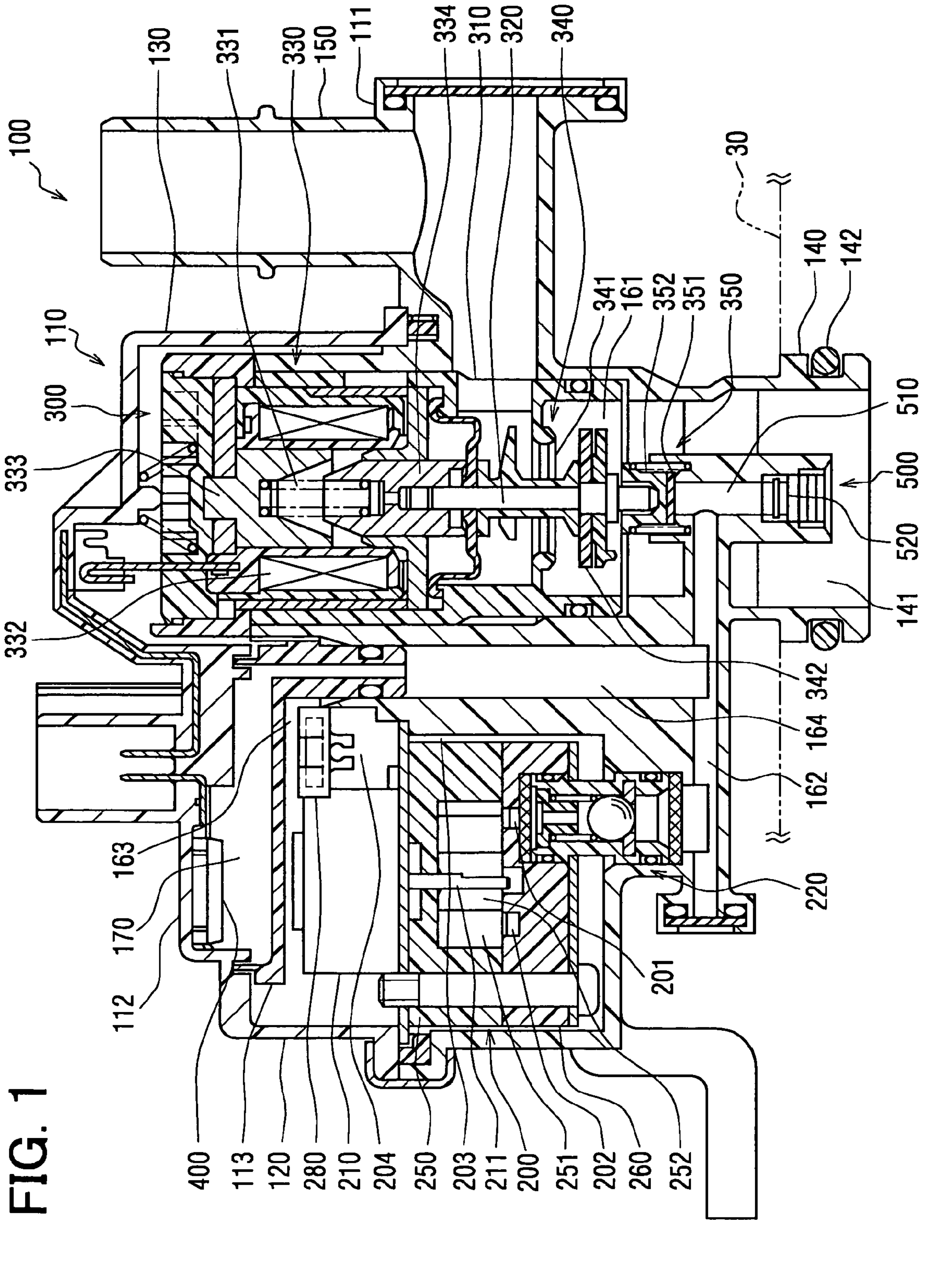
FIG. 1 is a cross sectional view of the leak check module according to the present invention.

The leak check system 10 includes the leak check module 100, a fuel tank 20, a canister 30, an intake device 40, and an ECU 50. As shown in FIG. 1, the leak check module 100 is provided with a housing 110, a pump 200, brushless motor 210, a switching valve 300, and a pressure sensor 400. The leak check module 100 is disposed above the fuel tank 20 and the canister 30 to prevent a flow of a liquid fuel or other liquid which flows from the fuel tank 20 into the canister 30 and the leak check module 100.

The housing 110 comprises a housing body 111, a housing cover 112, and the housing piece 113. The housing 110 accommodates the pump 200, the brushless motor 210, and the switching valve 300. The housing 110 forms a pump accommodating space 120 and a valve accommodating space 130 therein. The pump 200 and the brushless motor 210 are disposed in the pump accommodating space 120, and the switching valve 300 is disposed in the valve accommodating space 120. The housing body 111 is provided with a canister port 140 and an atmospheric vent port 150. The canister port 140 communicates with the canister 30 through a canister passage 141. The atmospheric vent port 150 communicates with an atmospheric passage 151 having an open end 153 at which an air filter 152 is disposed. The atmospheric passage 151 communicates with an atmosphere. The housing body 111 can be made with the housing of the canister 30 integrally.

As shown in FIG. 1, the housing 110 has a connecting passage 161, a pump passage 162, a discharge passage 163, a pressure introducing passage 164, and a sensor room 170. The connecting passage 161 connects the canister port 140 with the atmospheric vent port 150. The pump passage 162 connects the connecting passage 161 with an inlet port 201 of the pump 200. The discharge passage 163 connects the outlet port 202 of the pump 200 to the atmospheric vent port 150. The pressure introducing passage 164 is branched from the pump passage 162 and connects the pump passage 162 and the sensor room 170. Since the sensor room 170 communicates with the pressure introducing passage 164, the inner pressure of the sensor room 170 is almost the same as the pressure in the pump passage 162.

The discharge passage 163 is formed between the housing piece 113 and the pump 200 and between the housing piece 113 and the brushless motor 210 in the pump accommodating space 120, and is formed between the housing 110 and the switching valve 300 in the valve accommodating space 130. An air discharged from the outlet port 202 of the pump flows into a clearance (not shown) between the switching valve 300 and the housing 110 through a clearance 203 between the pump 200 and the housing 110 and a clearance 204 between the brushless motor 210 and the housing 110. The air flowing into the clearance between the switching valve 300 and the housing 110 flows into the atmospheric vent port 150 along the clearance.

The housing 110 has an orifice portion 500 at the side of the canister port 140. The orifice portion 500 has an orifice passage 510 which branches from the canister passage 141. The orifice passage 510 connects the canister port 140 with the pump passage 162 and has an orifice 520 therein. The orifice 520 corresponds to the size of an opening for which leakage of fuel vapor is acceptable. For example, the CARB and EPA regulations provide for accuracy of detecting leakage of fuel vapor from fuel tank 20. The regulations require that fuel vapor leakage through an opening equivalent to an opening having a diameter of 0.5 mm should be detected. In the present embodiment, the orifice 520 has a diameter of 0.5 mm or less. The orifice passage 510 is formed at the inside of the canister port 140 to form a double cylinder, whereby the connecting passage 161 is formed outside and the orifice passage 510 is formed inside.

The pump 200 having an inlet port 201 and the outlet port 202 is provided in the pump accommodating space 120. The inlet port 201 is exposed to the pump passage 162 and the outlet port is exposed to the discharge passage 163. A check valve 220 is disposed at the vicinity of the inlet port 201 of the pump 200. When the pump is driven, the check valve 220 is opened. When the pump is not driven, the check valve is closed to restrict the flowing of air-mixed fuel into the pump 200.

The pump 200 is provided with a pump housing 250, a pump case 260, and a rotor 252 rotating in the pump housing 250. The rotor 253 has a vane which is slidable in the radial direction and slides on the inner surface of the pump housing 250 while the rotor is rotating. By rotating the rotor 252, the air introduced from the inlet port 201 is discharged to the outlet port 202. The pump 200 functions as a suction pump to reduce the pressure in the fuel tank 20 through the canister 30.

Then pump 200 is provided with a brushless motor 210 of which shaft 211 is provided with the rotor 252 having the vane 251. That is the brushless motor 210 drive the pump 200. The brushless motor 210 is a DC motor which has no electric contact point and rotates the rotor, which is not shown, by changing a current applying position to a coil. The brushless motor is electrically connected to a control circuit 280 which controls the brushless motor 210 in a constant speed by controlling electricity from an electric source. The control circuit 280 is disposed in a clearance which forms the discharge passage 163. The control circuit 280 includes an electronic part generating heat such as a Zener diode and a Hall device. By disposing the control circuit 280 in the clearance 204 comprising the discharge passage 163, the control circuit 280 is cooled by air discharged from the pump 200.

Figure 3:
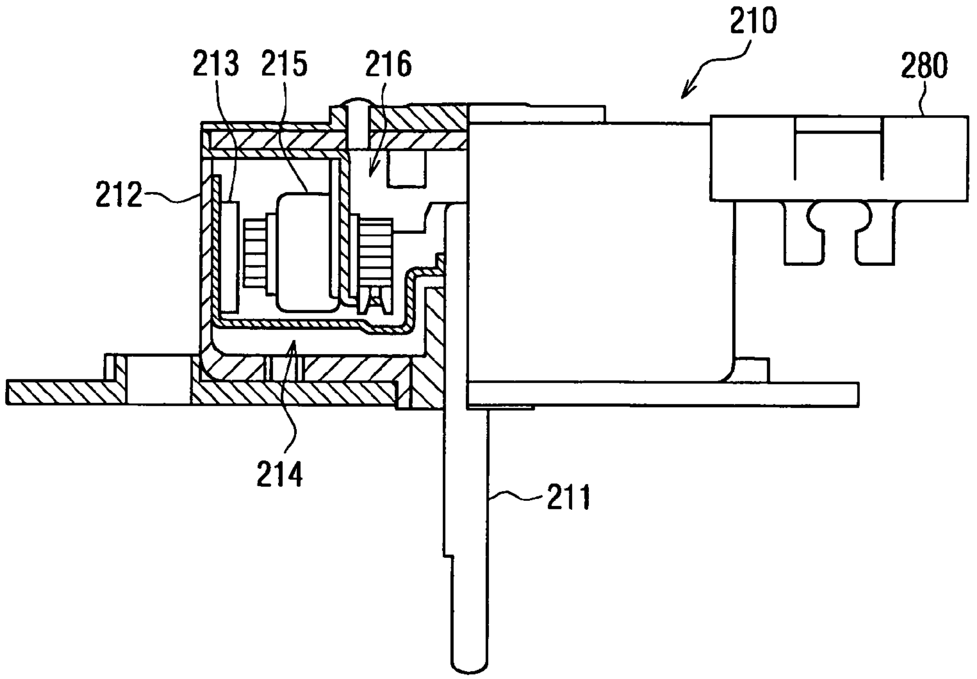
FIG. 3 is a partially sectional view of a brushless motor which is disposed in the leak check module.

The brushless motor 210, as shown in FIG. 3, has a cover 212 made from metal. The cover 212 accommodates a rotor 214 having a magnet 213 and a stator 216 having a coil 215. Even if the coil 215 is broken to cause an electric discharge, the cover 212 prevents a propagation of the electric discharge.

The switching valve 300 includes a valve body 310, a valve shaft 320, and a solenoid actuator 330. The valve body 310 is disposed in the valve accommodating space 130. The switching valve 300 includes an opening-closing valve 340 and a reference valve 350. The opening-closing valve 340 includes a first valve sheet 341 and a washer 342 which is provided on the valve shaft 320. The reference valve 350 includes a second valve sheet 351 formed on the housing 110 and a valve cap 352 fixed on one end of the valve shaft 320.

The valve shaft 320 is actuated by the solenoid actuator 330 and has the washer 342 and valve cap 352. The solenoid actuator 330 has a spring 331 biasing the valve shaft 320 toward the second valve sheet 351. The solenoid actuator 330 has a coil 332 which is connected to the ECU 50. The ECU 50 controls an electric supply to the coil 332. When the electric current is not supplied to the coil 332, no attracting force is generated between a fixed core 333 and a movable core 334. Thus, the valve shaft 320 fixed to the movable core 334 moves down in FIG. 1 by biasing force of the spring 331 so that the valve cap 352 closes the second valve sheet 351. Thereby, the connecting passage 161 is disconnected from the pump passage 162. The washer 342 opens the first valve sheet 341 to communicate the canister port 140 to the atmospheric vent port 150 through the connecting passage 161. Therefore, when the electric current is not supplied to the coil 332, the canister port 140 is disconnected from the pump passage 162 and the canister port 140 is communicated to the atmospheric vent port 150.

When the electric current is supplied to the coil 332 according to the signal from the ECU 40, the fixed core 334 attracts the movable core 333. The valve shaft 320 connected with the movable core 334 moves up against the biasing force of the spring 331. The valve cap 352 opens the second valve sheet 351 and the washer 342 close the first valve sheet 341 whereby the connecting passage 161 communicates the pump passage 162. Therefore, when the coil is energized, the canister port 140 communicates with the pump passage 162 and the canister port 140 disconnects from the atmospheric vent port. The orifice passage 510 always communicates with the pump passage 162, regardless of whether the coil 332 is energized.

The canister 30, as shown in FIG. 2, has therein a fuel vapor adsorbent material 31 such as activated carbon granules, which adsorbs fuel vapor generated in the fuel tank 20. The canister 30 is disposed between the leak check module 100 and the fuel tank 20. The canister passage 141 connects the canister 30 with the leak check module 100 and a tank passage connects the canister 30 with the fuel tank 20. A purge passage 33 connects the canister 31 to an intake pipe 41 of the intake device 40. The fuel vapor generated in the fuel tank 20 is adsorbed by the adsorbent material 31 while flowing through the canister 30. The fuel concentration in the air flowing out from the canister 30 is less than a predetermined value. The intake pipe 31 has a throttle valve 42 therein which controls air amount flowing in the intake pipe 31. The purge passage 33 has a purge valve 34 which opens and closes the purge passage 33 according to the signal from the ECU 50.

The pressure sensor 400, as shown in FIG. 1, is disposed in the sensor room 170. The pressure sensor 400 detects the pressure in the sensor room 170 and outputs signals to the ECU 170 according to the detected pressure. The sensor room 170 communicates with the pump passage 162 through the pressure introducing passage 164. Thus, the pressure in the sensor room 170 is substantially equal to the pressure in the pump passage 162. The pressure sensor 400 is disposed far from the pump 200 by which pressure fluctuation caused by the pump 200 is more reduced than the case in which the pressure sensor 400 is disposed close to the inlet port 201 of the pump 200. Therefore, the pressure sensor 400 detects the pressure in the sensor room 170 more precisely.

The ECU 50 is comprised of microcomputer which has CPU, ROM, and RAM (not shown) and controls the leak check module 100 and other components on the vehicle. The ECU 50 receives multiple signals from sensors to execute control programs memorized in ROM. The brushless motor 210 and the switching valve 300 are also controlled by the ECU 50.

The construction of the housing 110 of the leak check module 100 is described herein after.

The housing body 111 comprises a first cup portion 121 and a second cup portion 131. The first cup portion 121 cooperates with the housing cover 112 in defining a pump accommodating space 120, and the second cup portion 131 cooperates with the housing cover 112 in defining a valve accommodating space 130. The housing 111 has a cylindrical passage 114 extending between the first cup portion 121 and the second cup portion 131. One end of the cylindrical passage is communicated with the pump passage 162 through a hole 115, and the other end is connected to housing piece 113.

The housing piece 113 is disposed between the housing body 111 and the housing cover 112. The housing piece 113 has a cylindrical portion 113*a* inserted into the cylindrical passage 114. The cylindrical passage 114 and the cylindrical portion 113*a* comprise a pressure introducing passage 164. The house piece 113 is disposed between the housing body 111 and the housing cover 112 to divide a space formed by the housing body 111 and the housing cover 112. The housing piece 113 and the housing cover 111 define the pump accommodating space 120, and the housing piece 113 and the housing cover 112 define the sensor room 170.

The sensor room 170 communicates with the cylindrical passage 114 through the cylindrical portion 113*a*, whereby the sensor room 170 communicates with the pump passage 162 through the pressure introducing passage 164. A pressure sensor 400 is glued on the inner surface of the housing cover 112 in the sensor room 170.

As shown in FIG. 1, the pump 200 is disposed in the first cup portion 121. Because the outer diameter of pump 200 is slightly smaller than the inner diameter of the first cup portion 121, the clearance 203 is formed there between. The brushless motor 210 is disposed at opposite side to the pump 162 in the pump accommodating space 120. Because the outer diameter of the brushless motor 210 is slightly smaller than the inner diameter of the first cup portion 121, the clearance 204 is formed between the brushless motor 210 and the first cup portion 121.

The brushless motor 210 does not have a blush and a commutator, and an axis thereof is shorter than a conventional DC motor. Thus, there is a space above the brushless motor 210 to define the sensor room 170. The diameter of one part of the solenoid actuator 330 is smaller than the inner diameter of the second cup portion 131, a clearance (not shown) is formed between the valve body 310 and the housing body 111. The clearance 203 and the clearance 204 communicate with a clearance between the switching valve 300 and the housing body 111. A clearance (not shown) formed between the switching valve 300 and the housing body 111 communicates with atmospheric port 150. Thus, the discharged air from the pump 200 is introduced into the atmosphere through the clearance 203, the clearance 204 and the clearance between the switching vale 300 and the housing body 156. That is, the clearance 203, the clearance 204 and the space between the switching valve and the housing body 111 forms the discharge passage 163 through which the air discharged from the pump 200 flows.

The control circuit 204, which controls the brushless motor in a constant speed, is disposed in the clearance 204 forming the discharge passage 163. The heating element such as the Zener diode is provided in the control circuit 204. A heating of the control circuit 204 must be reduced in order to control the brushless motor accurately. Thus, the control circuit 204 is disposed in the clearance 204 forming the discharge passage 163 to cool the same. The air cooling the control circuit 204 flows into the atmospheric vent port 150 through the discharge passage 163. The sensor room 170 is defined by the housing piece 113 so that the air heated by the control circuit 204 does not flows into the sensor room 170.

The inlet 201 of the pump 201 is formed in the pump case 260 to communicate with the pump passage 162. The pressure sensor 400 is disposed at the opposite side of the inlet 201 of the brushless motor 210. Since the pressure sensor 400 is disposed away from the inlet 201, the fluctuation of the pressure at the inlet 201 does not affect the pressure sensor 400. Even if the pressure of air discharged from the pump 200 fluctuates, the pressure sensor 400 can precisely detect the pressure in the fuel tank 200 which communicates with the pump passage 162.

The operation of the leak check module 100 is described herein after.

When a predetermined period elapses after the engine is turned off, the fuel vapor leak check is conducted. The predetermined period is set to stabilize the vehicle temperature. While the engine is running and until the predetermined period elapses after the engine is turned off, the fuel vapor leak check by the leak check module 100 is not conducted. The coil 332 is not energized, and the canister port 140 and the atmospheric vent port 150 are connected with each other through the connecting passage 161. The fuel vapor fraction of the fuel vapor/air mixture adsorbs in the canister 30. Then, the air fraction is expelled from the opening end 153 of the atmospheric passage 151. At this moment, the check valve 220 is closed, air including fuel vapor generated in the fuel tank 20 is prevented from flowing into the pump 200.

(1) When the predetermined period elapses after the engine is turned off, an atmospheric pressure is detected prior to the fuel vapor leak check. That is, since the fuel vapor leak check is conducted based on the pressure change with the pressure sensor 400, it is necessary to reduce an atmospheric effect due to altitude. When the coil 332 is not energized, the atmospheric vent port 150 communicates with the pump passage 162 through the orifice passage 510. Since the sensor room 170 communicates with the pump passage 162 through the pressure introducing passage 164, the pressure in the sensor room 170 is substantially equal to the atmospheric pressure. The atmospheric pressure detected by the pressure sensor 400 is converted to a pressure signal, the pressure signal being output to the ECU 50. The pressure signal from the pressure sensor 400 is outputted as a ratio of voltage, a duty ratio, or a bit output. Thus, the noise effect generated by the solenoid actuator 330 or other electric actuators can be reduced to maintain the detection accuracy of the pressure sensor 400. At this moment, only the pressure sensor 400 is turned on and the brushless motor 210 and the switching valve 300 are turned off. This state is indicated as an atmospheric pressure detection period A in FIG. 5. The pressure detected in the sensor room 170 is equal to the atmospheric pressure.

(2) After the atmospheric pressure is detected, the altitude at which the vehicle is parked is calculated according to the detected atmospheric pressure. For example, the altitude is calculated based on a map showing a relationship between the atmospheric pressure and the altitude, which is memorized in ROM of the ECU 50. The other parameters are corrected according to the calculated altitude. The calculation and the correction above are executed by ECU 50.

Figure 5:
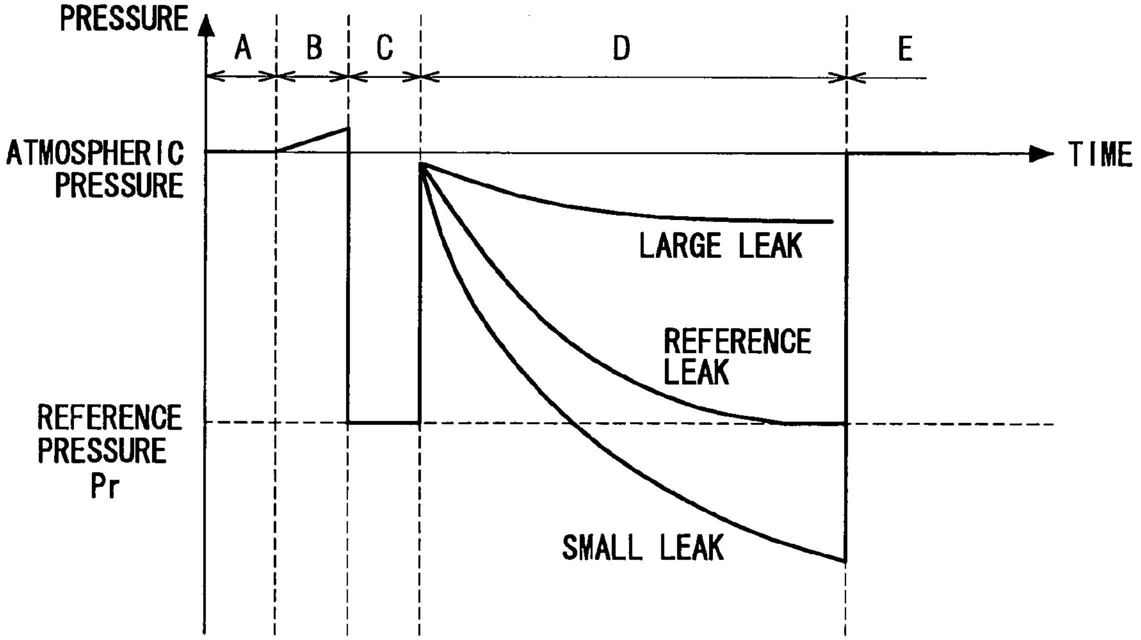
FIG. 5 is a graph showing a pressure change detected by a pressure sensor of the leak check module.
Figure 4:
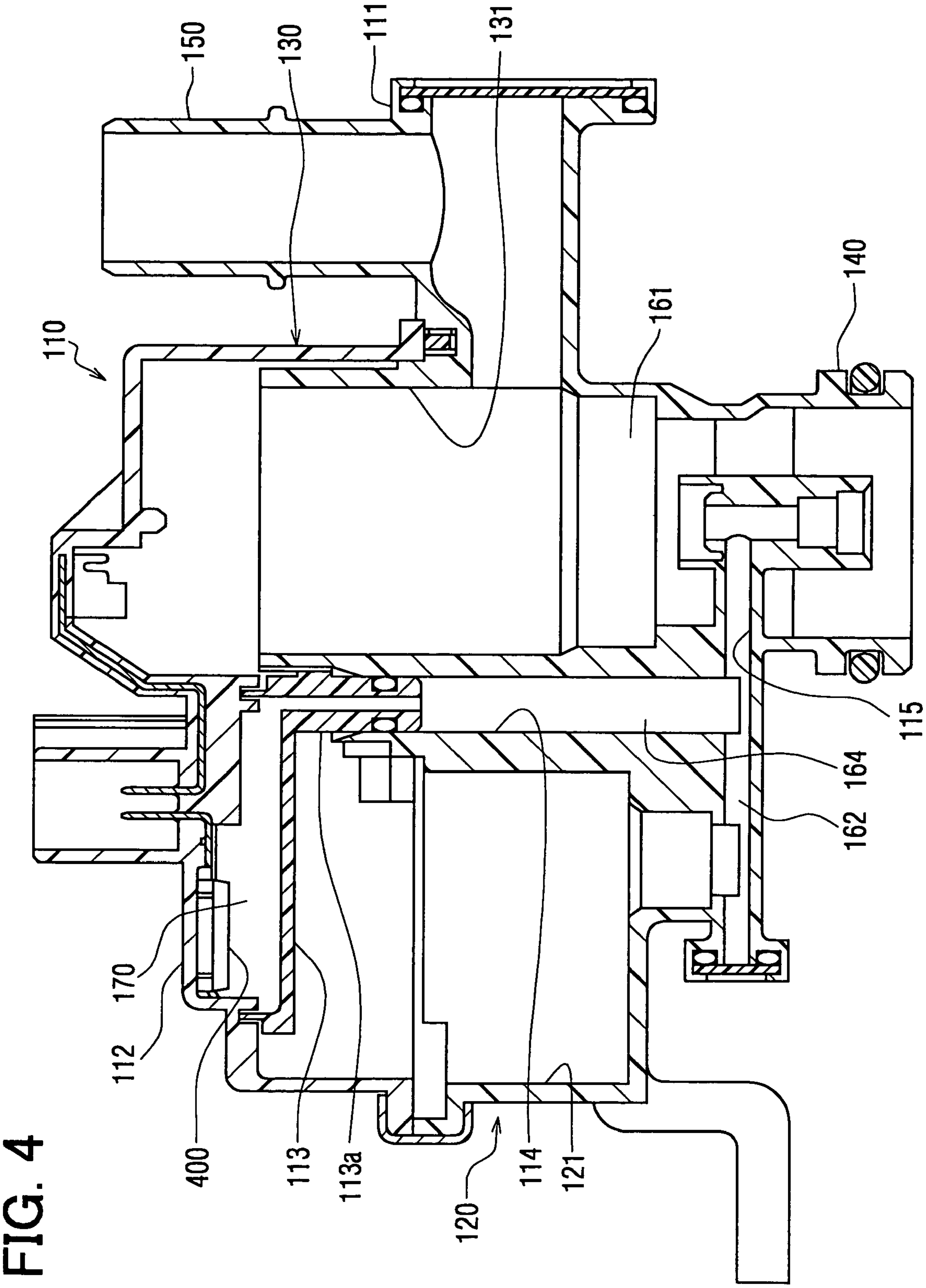
FIG. 4 is a cross sectional view of a housing of the leak check module.

After the correction of parameters is executed, the coil 332 of the switching valve 300 is energized of which state is indicated as a fuel vapor detection period B in FIG. 5. Since the coil 332 is energized, the fixed core 333 attracts the movable core 334 so that the washer 342 closes the first valve sheet 341 and the valve cap 352 opens the second valve sheet 351. The atmospheric vent port 150 disconnects from the pump passage 162, and the canister port 140 connects to the pump passage 162. As a result, the sensor room 170 connected to the pump passage 162 is connected with the fuel tank 20 through the canister 30. The pressure in the fuel tank 20 is larger than the ambient pressure due to the fuel vapor. The pressure detected by the pressure sensor 400 is slightly larger than the atmospheric pressure as shown in FIG. 5.

(3) When the increment of the pressure in the fuel tank 20 is detected, the coil 332 of the switching valve 300 is deenergized. This state is indicated as a reference detection range C in FIG. 5. The moving core 334 and the valve shaft 320 move in biasing direction of the spring 331 so that the washer 342 opens the first valve sheet 341 and the valve cap 352 closes the second valve sheet 351. The pump passage 162 communicates with the canister port 140 and the atmospheric vent port 150 through the orifice passage 510. The canister port 140 communicates with the atmospheric vent port 150 through the connecting passage 161.

When the brushless motor 210 is energized, the pump 200 is driven to reduce the pressure in the pump passage 162 so that the check valve 220 is opened. The air flowing into the canister port 140 from atmospheric vent port 150 and air/fuel mixture flowing from the canister port 140 flow into the pump passage 162 through the orifice passage 510. Since the air flowing into the pump passage 162 is restricted by the orifice 520 in the orifice passage 510, the pressure in the pump passage 162 is decreased as shown in FIG. 5. Since the orifice 520 has a constant aperture, the pressure in the pump passage 162 is decreased to a reference pressure Pr, which is memorized in RAM of the ECU 50. After the reference pressure Pr is detected, the brushless motor 210 is deenergized.

(4) When the detection of reference pressure is finished, the coil 322 of the switching valve 300 is energized again. The washer 342 closes the first valve seat 341 and the valve cap 352 opens the second valve sheet 351 so that the canister port 140 communicates with the pump passage 162. That is, the fuel tank 20 communicates with the pump passage 162 so that the pressure in the pump passage 162 becomes equal to the pressure in the fuel tank 20. The pressure in the fuel tank 20 is almost the atmospheric pressure. The brushless motor 210 is energized again to drive the pump and to open the check valve 220 so that the pressure in the fuel tank 20 decreases. The pressure in the sensor room 170, which is detected by the pressure sensor 400, decreases gradually. This state is illustrated as depressurizing range D in FIG. 5.

While the pump 200 is operated, when the pressure in the sensor room 170, which is equal to the pressure in the fuel tank 20, becomes under the reference pressure Pr, it is determined that the amount of fuel vapor leakage is under the permissible value. In other words, no air is introduced into the fuel tank 20 from outside, or amount of air introducing into the fuel tank is less than the amount which is equivalent to the orifice leakage. Therefore, it is determined that the sealing of the fuel tank 20 is enough.

On the other hand, when the pressure in the fuel tank 20 does not decrease to the reference pressure Pr, it is determined that the amount of fuel vapor leakage is over the permissible value. It is likely that the outside air is introduced into the fuel tank 20 during depressurizing. Therefore, it is determined that the sealing of the fuel tank 20 is not enough. In this case, it is likely that the fuel vapor in the fuel tank 20 escapes over the permissible value. When it is determined that impermissible amount of fuel vapor leakage exists, a warning lamp on a dashboard (not shown) is turned on to notify the driver of fuel vapor leakage at a successive operation of the vehicle.

When the pressure in the fuel tank 20 is almost equal to the reference pressure Pr, it means that the fuel vapor leakage arises, the fuel vapor leakage being equivalent to the fuel vapor leakage through the orifice 520.

(5) When the detection of fuel vapor leakage is finished, the brushless motor 210 and the switching valve 300 are turned off. This state is illustrated as a range E in FIG. 5. In the ECU 50, it is confirmed that the pressure in the pump passage 162 is recovered to the atmospheric pressure as shown in FIG. 5. Then, the pressure sensor 400 is turned off to finish the all-detecting step.

In this embodiment, the pressure sensor 400 and the inlet 201 are provided at opposite ends of the shaft of the brushless motor 210. The pressure fluctuation of the air at the inlet 201 does not affect to the pressure sensor 400, so that the pressure sensor can detect the pressure in the fuel tank 20 precisely.

The brushless motor has a shorter axis than a conventional DC motor so that the housing 110 can be made compact.

The clearances are formed as the discharge passage 163 between the housing 110 and the pump 200, and between the brushless motor 210 and switching valve 300, so that an additional discharge passage is not necessary in the housing 110.

The control circuit 280 is disposed in the clearance 204 so that the control circuit 280 is cooled by the air flowing through the clearance 204 to enhance the accuracy of the fuel vapor leak check.

The housing piece 113 is interposed between the discharge passage 163 and the sensor room 170 so that the heated air by the control circuit 280 hardly flows into the sensor room 170 to enhance the accuracy of the fuel vapor leak check.

The pressure introducing passage 164 is formed between the pump accommodating space 120 and the valve accommodating space 130 so that a noise generated by the breakage of the coil does not affect the control circuit 280.

The fuel vapor leakage is detected by reducing the pressure in the fuel tank 20 so that fuel vapor does not flow out from the fuel tank 20 during the leakage detection. It is beneficial to the environments.

Since the brushless motor 210 has no contact point, a fluctuation of the operation due to an abrasion of contacts is avoided. By using the pressure sensor 400, the pressure in the fuel tank 20 is precisely detected without respect to the altitude at which the vehicle is parked. Thus, the detection accuracy is enhanced and the leak check module 100 lasts longer than the conventional one.

A conventional DC motor or a conventional AC motor can be used instead of the brushless motor 210.

What is claimed is:

1. A fuel vapor leak check module for detecting a fuel vapor leakage from a fuel tank by depressurizing an interior of the fuel tank, the fuel vapor leak check module comprising:

a pump having an inlet and an outlet and decreasing the pressure in the fuel tank;

a motor driving the pump;

a pressure introducing passage branched from the inlet of the pump, and a pressure sensor disposed across the motor at a position opposite to the inlet of the pump in an axial direction of the motor, the pressure sensor being fluidly connected with the pressure introducing passage.

2. The fuel vapor leak check module according to claim 1, further comprising:

a switching valve for opening and closing a passage communicating with the inlet of the pump; and a housing including a pump accommodating space to accommodate the pump and the motor, a valve accommodating space to accommodate a switching valve, a pump passage connecting the switching valve to the inlet of the pump, the pressure introducing passage branched from the pump passage, and a sensor room fluidly connected with the pressure introducing passage, the sensor room accommodating the pressure sensor therein.

3. The fuel vapor leak check module according to claim 2, wherein the motor is a brushless motor.

4. The fuel vapor leak check module according to claim 2, wherein the housing includes a discharge passage between the pump, the motor and the switching valve, and air discharged from the outlet flows through the discharge passage.

5. The fuel vapor leak check module according to claim 4, further comprising:

a control circuit disposed in the discharge passage and controlling the electricity supplied to the motor.

6. The fuel vapor leak check module according to claim 5, wherein the sensor room is isolated from the discharge passage.

7. The fuel vapor leak check module according to claim 2, wherein the pressure introducing passage is provided between the pump accommodating space and the valve accommodating space.

8. A fuel vapor leak check module for detecting a fuel vapor leakage from a fuel tank by depressurizing an interior of the fuel tank, the fuel vapor leak check module comprising:

a pump having an inlet and an outlet and decreasing the pressure in the fuel tank;

a motor driving the pump;

a pressure sensor disposed at a position opposite to the inlet of the pump in an axial direction of the motor;

a switching valve for opening and closing a passage communicating with the inlet of the pump; and a housing including a pump accommodating space to accommodate the pump and the motor, a valve accommodating space to accommodate a switching valve, a pressure introducing passage branched from the pump passage, and a sensor room, in which the pressure sensor is disposed, the pressure sensor being disposed at a position opposite the pump passage, wherein the housing includes a discharge passage between the pump, the motor and the switching valve, and air discharged from the outlet flows through the discharge passage, and further comprising a control circuit disposed in the discharge passage and controlling the electricity supplied to the motor.

9. The fuel vapor leak check module according to claim 8, wherein the sensor room is isolated from the discharge passage.

* * * * *